Patented Mar. 19, 1935

1,994,993

UNITED STATES PATENT OFFICE 1,994,993

BAKING PROCESS

Louis W. Haas, Chicago, and Herbert Otto Renner, Des Plaines, Ill., assignors, by mesne assignments, to J. R. Short Milling Company, Chicago, Ill., a corporation of Illinois No Drawing. Application January 30, 1933, Serial No. 654,304. Renewed July 27, 1934

8 Claims. (Cl. 99—10)

This invention relates to baking processes and more particularly to the preparation and treatment of dough to obtain an improved baked product.

An object of the present invention is to provide an improved process by which dough is bleached and by which improved bread loaves, for instance, are obtained in respect to color, taste, texture and odor.

The invention is a departure from bleaching processes in which flour has been bleached by the use of prepared inorganic or organic chemical powders or electric treatments. It has been found that troublesome factors in baking, due to such prior known bleaching treatments, are avoided by this present invention.

The present process comprises adding to a dough mix, material containing enzyme oxidized matter in sufficient quantity to effect whitening of dough, to some extent during the mixing stage, but primarily during the baking of the dough. The oxidized matter employed as a bleaching agent comprises new and improved organic oxidation products prepared by contacting oxidizable organic compositions and gas containing free oxygen in the presence of enzymic material containing enzymes which effect the catalytic oxidation of such compositions. A detailed description of the bleaching agents employed and of the process of preparing the same is set forth in our copending application Serial No. 649,110, filed December 27, 1932.

In accordance with the invention set forth in the aforesaid application, an improved bleaching agent is prepared with the use of animal or vegetable oils or fats, particularly those generally included in shortenings. Fatty acid compounds including the acids themselves or the corresponding esters are also usable in the preparation of the particular bleaching agent employed in the present process. For instance, cocoanut oil, cottonseed oil, corn oil, poppyseed oil, butter, lard, hydrogenated fats or oils, and fatty acids or esters derived from the fats and oils mentioned may be treated to obtain the desired oxidation product.

The above fatty materials are mixed with the enzymic material and aerated or in other words mixed thoroughly with air, pure oxygen or ozone, or oxygen or ozone diluted with air, nitrogen or other inert gas. Hydrogen peroxide may also be used as a source of oxygen. If desired, the fatty material may be emulsified and aerated in the presence of enzymes. Various materials may be employed for supplying enzymes and more particularly oxidizing enzymes including peroxidase, oxidase, catalase, and perhydridase. Meal from soya beans or peas or navy beans, and which has not been rendered inactive, has been found to be a satisfactory source of enzyme material. Soya bean milk or extracts of leguminous materials may be used. The oxidation of the fatty material may be carried on at atmospheric or superatmospheric pressure and at temperatures as high as substantially 50° C.

The production of oxidized oil proceeds very satisfactorily at low temperatures. In some respects the lower temperatures give better results than the higher temperatures, such temperatures being however below substantially 50° C. This is particularly true as to the results obtained with respect to flavor. A temperature a few degrees above the congealing or solidifying temperature of a fat gives good results both as to degree of oxidation and as to flavor.

Enzyme oxidized fats and oils prepared by the method described above differ fundamentally from peroxidized oils and fats prepared by strictly chemical methods with regard to their constitution or composition and the mechanism of their oxidizing action and effects. The amount necessary to produce the desired effect is small compared with the amount of dough treated and depends on the degree of oxidation of the oil or fat used in the shortening. In general, if the degree of oxidation be represented by M expressed in terms of molecules of hydrogen peroxide per 1000 grams of the oil or fat, the amount A (expressed in percent of the flour used in a dough) of enzyme-oxidized shortening required for producing complete bleaching in a dough may be determined from the following formula:

$$A = \frac{0.15}{M}\%.$$

The following examples serve to illustrate the process of the present invention:

Example I

A dough is prepared from the following:
- 700 parts by weight of unbleached flour
- 35 parts by weight of sugar
- 12.5 parts by weight of salt
- 1.75 parts by weight of a commercially known "improver" of the following composition:
  - 40 % flour, as filler
  - 25 % salt
  - 25 % calcium sulphate
  - 9.7% ammonium chloride
  - 0.3% potassium bromate
- 13 parts by weight of Fleischmann's yeast.

A shortening prepared in a manner to be described is added to the above ingredients and mixed for a comparatively short period, namely, about 3½ minutes.

The shortening is prepared as follows: About 360 parts by weight of "Scoco", a shortening containing incompletely hydrogenated cottonseed oil, are aerated with a suspension of about 150 parts by weight of soya flour in 360 parts by weight of water at about 100° F. for four to five hours. The mix is centrifuged and the fat decanted. About 0.3% by weight of the resulting fat (M value=0.2366) and about 2.7% of untreated "Scoco" (M value=0.0245) are added to the above dough mix.

After the mixing and fermentation of the dough, baking for about thirty minutes produces a bread loaf of excellent color.

Example II

To a dough mix similar to that set forth in Example I, a shortening comprising the same materials as those in the shortening in Example I are added in the same proportions. In addition, about 0.01% of unsterilized soya flour is included. The mixing is carried on for about 3½ minutes, and after suitable raising and fermentation periods, the dough is baked.

Example III

To a dough mix similar to that given in Example I, a shortening prepared in the following manner is added: "Scoco" having an M value of about 0.0095 is melted together with about 20% of its weight of crushed sesame seed and the fat decanted. (The resulting fat has an M value of about 0.0006). About 360 parts by weight of the resulting material is aerated with a suspension of about 150 parts by weight of unsterilized soya flour in 460 parts by weight of water for about four hours. The mix is centrifuged and the fat decanted. (M value of this fat=0.3385).

About 0.3% by weight of the above prepared fatty mix and about 2.7% "Scoco" is added to the dough mix and mixed in a dough mixing machine for about 3½ minutes. After raising and fermenting, the dough is baked for a half hour and produces a baked product of excellent white color.

As seen in the above examples various combinations of enzyme-oxidized fatty materials may be used as well as enzyme oxidized fats or oils mentioned in the early part of this description. It is also noted that improved results are obtained by including with the enzyme oxidized fatty materials, enzyme containing leguminous flours. For instance, in certain cases by including 0.05% to 0.1% of soya flour with 2% of enzyme oxidized "Scoco" which latter was found to produce insufficient bleaching, good bleaching resulted by including both. It is understood that the other leguminous materials including soya bean milk or extracts of leguminous materials, mentioned above, if used in place of or in combination with the soya flour, may be employed in quantities equivalent to the quantity of soya flour ordinarily combined with the enzyme oxidized fatty material. The bean flours or other sources of enzymic matter mentioned herein and employed in the present process are not ordinary commercial material but especially prepared so as to retain their enzyme value and therefore are "active" within the meaning of this specification. The proportions of enzymic materials and oxidation products may be varied depending upon the amount of bleaching desired.

The dough mix may be prepared with or without the inclusion of such materials as lecithin, or "improvers" of any kind, as for instance of the composition specified for that particular "improver" hereinbefore mentioned. A combination of ingredients such as 2% of "Scoco" (enzyme-oxidized), 10% lecithin and 0.05% of soya flour added to a dough mix, produces highly desirable results.

As stated above, it has been found that by means of the present invention, the bleaching action occurs primarily in the initial period of baking. The bleaching effect with enzyme oxidized fatty materials does not depend upon the incorporation of atmospheric oxygen during the mixing of the dough as is required with certain known dough bleaching agents. Bleaching is most active in the present process as soon as the dough is exposed to higher temperatures, that is, in the proof box, and especially in the oven. It is therefore not necessary to use high speed mixing to obtain decided bleaching results with oxidized oils or fats. Slow speed or even hand mixing is sufficient.

In the present process, not only is the desired whitening obtained by the use of a comparatively small amount of bleaching agent or enzyme oxidized material, but there is an improvement in odor, taste, and texture of the baked product.

If desired, the commercial product known as "Wytase" may be used as the source of the soya flour. "Wytase" is a mixture of unsterilized or active soya flour and processed corn flour, which latter, so far as the present invention is concerned, does not serve as a bleaching medium, but chiefly as a diluent and carrier for the soya flour and is not disadvantageous to the process.

What we claim is:

1. In a process of producing baked products from dough, the step of baking dough in the presence of enzyme oxidized fatty material to effect bleaching of the dough.

2. In a process of producing baked products from dough mixtures, the step of baking dough in the presence of shortening containing dough bleaching material prepared by contacting fatty matter and gas containing free oxygen in the presence of enzymes which effect the catalytic oxidation of the said fatty matter.

3. A baking process comprising incorporating in a dough mix enzyme oxidized fatty material, and baking the resulting mixture to obtain a bleached and baked product.

4. A baking process comprising incorporating in a dough mix an amount (A) of enzyme oxidized fatty material determined by the formula $$A = \frac{0.15}{M}\%$$

wherein M represents the degree of oxidation of the fatty material, and baking the resulting mixture to obtain a bleached and baked product.

5. A baking process comprising incorporating in a dough mix enzyme-containing material and fatty material previously treated with gas containing oxygen in the presence of oxidizing enzymes, and baking the resulting mix.

6. A baking process comprising incorporating in a dough mix a combination of ingredients for effecting the whitening of the dough during the mixing and baking of the dough, the said combination of ingredients comprising soya bean flour containing active enzymes and enzyme oxidized fatty material, and baking the resulting mix.

7. A baking process comprising incorporating in a dough mix a combination of ingredients for effecting the whitening of the dough during mixing and baking of the dough, the said combination of ingredients comprising about 0.01% of soya flour containing active enzymes and shortening containing about 0.3%, on the basis of the weight of flour, of enzyme oxidized fatty material, and baking the resulting mix.

8. A baking process comprising incorporating in a dough mix a combination of ingredients for effecting the whitening of the dough during the mixing and baking of the dough, the said combination of ingredients comprising active dough bleaching enzyme-containing material and enzyme oxidized fatty material, and baking the resulting mix.

LOUIS W. HAAS.
HERBERT O. RENNER.